United States Patent
Haye et al.

(10) Patent No.: US 10,644,982 B2
(45) Date of Patent: May 5, 2020

(54) REAL-TIME DATA ANALYTICS FOR STREAMING DATA

(71) Applicant: INTERNATIONAL BUSINESS MACHINES CORPORATION, Armonk, NY (US)

(72) Inventors: Donnie Haye, Durham, NC (US); Eric V. Kline, Rochester, MN (US); Jeffrey G. Komatsu, Kasson, MN (US); Anthony C. Spielberg, Austin, TX (US); Benjamin J. Steele, Jr., Newburgh, NY (US); John M. Wargo, Poughkeepsie, NY (US); Emmanuel Yashchin, Yorktown Heights, NY (US); Paul A. Zulpa, Woodbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 12 days.

(21) Appl. No.: 16/136,344

(22) Filed: Sep. 20, 2018

(65) Prior Publication Data

US 2019/0036805 A1      Jan. 31, 2019

Related U.S. Application Data

(63) Continuation of application No. 15/197,804, filed on Jun. 30, 2016, now Pat. No. 10,171,334.

(51) Int. Cl.
*H04L 12/26*      (2006.01)

(52) U.S. Cl.
CPC .............. *H04L 43/16* (2013.01); *H04L 43/04* (2013.01)

(58) Field of Classification Search
CPC .......... H04L 43/06; H04L 43/08; H04L 43/16
USPC ........................................................ 709/224
See application file for complete search history.

(56) References Cited

U.S. PATENT DOCUMENTS

| | | | | |
|---|---|---|---|---|
| 2005/0096873 A1* | 5/2005 | Klein | ..................... | G01H 1/006 702/184 |
| 2011/0035188 A1* | 2/2011 | Martinez-Heras | ... | G05B 23/021 702/189 |
| 2014/0074867 A1* | 3/2014 | McFarland | ........ | G06Q 10/0639 707/754 |
| 2015/0066430 A1* | 3/2015 | Priori | ................. | G05B 23/0235 702/179 |

(Continued)

OTHER PUBLICATIONS

List of IBM Patents or Patent Applications Treated As Related; Date Filed: Sep. 20, 2018, 2 pages.

*Primary Examiner* — Glenford J Madamba
(74) *Attorney, Agent, or Firm* — Cantor Colburn LLP; Tihon Poltavets

(57) ABSTRACT

A computer-implemented method includes receiving a plurality of values of a data stream, where the plurality of values are generated by a monitored device and received in real time. One or more statistical moments of the data stream are updated, by a computer processing device, based on each value of the plurality of values. Each value of the plurality of values is discarded, after updating the one or more statistical moments of the data stream based on that value. A threshold is set for the data stream based on the one or more statistical moments. It is detected that the threshold has been passed by the data stream. A remedial action is performed on the monitored device, responsive to the threshold being passed, where the remedial action is associated with the threshold.

20 Claims, 7 Drawing Sheets

(56) References Cited

U.S. PATENT DOCUMENTS

2018/0006924 A1  1/2018  Haye

* cited by examiner

REAL-TIME DATA ANALYTICS FOR STREAMING DATA

DOMESTIC PRIORITY

This application is a continuation of U.S. Non-Provisional application Ser. No. 15/197,804, titled "REAL-TIME DATA ANALYTICS FOR STREAMING DATA," filed Jun. 30, 2016, the contents of which are incorporated herein by reference in their entirety.

BACKGROUND

Embodiments of the present invention relate to data analytics and, more specifically, to real-time data analytics for streaming data.

Machine-to-machine control occurs when two or more devices communicate with one another and one device controls or instructs another. This is becoming more important as embedded machine intelligence continues to evolve, and for machine-to-machine control to become more effective, continued advancement in machine intelligence is needed. This advancement requires new techniques in machine and data assessment, analytics, and action to interoperably and seamlessly control system functions.

SUMMARY

According to an embodiment of this disclosure, a computer-implemented method includes receiving a plurality of values of a data stream, where the plurality of values are generated by a monitored device and received in real time. One or more statistical moments of the data stream are updated, by a computer processing device, based on each value of the plurality of values. Each value of the plurality of values is discarded, after updating the one or more statistical moments of the data stream based on that value. A threshold is set for the data stream based on the one or more statistical moments. If it is detected that the threshold has been passed by the data stream, a remedial action is performed on the monitored device, responsive to the threshold being passed, where the remedial action is associated with the threshold.

In another embodiment, a system includes a memory having computer readable instructions and one or more processors for executing the computer readable instructions. The computer readable instructions include receiving a plurality of values of a data stream, where the plurality of values are generated by a monitored device and received in real time. Further according to the computer readable instructions, one or more statistical moments of the data stream are updated, based on each value of the plurality of values. Each value of the plurality of values is discarded, after updating the one or more statistical moments of the data stream based on that value. A threshold is set for the data stream based on the one or more statistical moments. If it is detected that the threshold has been passed by the data stream, a remedial action is performed on the monitored device, responsive to the threshold being passed, where the remedial action is associated with the threshold.

In yet another embodiment, a computer program product for analyzing streaming data includes a computer readable storage medium having program instructions embodied therewith. The program instructions are executable by a processor to cause the processor to perform a method. The method includes receiving a plurality of values of a data stream, where the plurality of values are generated by a monitored device and received in real time. Further according to the method, one or more statistical moments of the data stream are updated, based on each value of the plurality of values. Each value of the plurality of values is discarded, after updating the one or more statistical moments of the data stream based on that value. A threshold is set for the data stream based on the one or more statistical moments. If it is detected that the threshold has been passed by the data stream, a remedial action is performed on the monitored device, responsive to the threshold being passed, where the remedial action is associated with the threshold.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Given a large stream of data, machine-to-machine control may require that the data be analyzed at streaming rate, to enable real-time or quasi-real-time reactions. For example, it is often useful to set thresholds for data values, such that any data beyond the thresholds invokes an alert, which can come to the attention of a device or a human being. The alert may be part of an early warning system (EWS) or quality early warning system (QEWS). However, thresholds may need to be dynamic so as to accurately reflect historical values, thus ensuring that alerts are issued only when data is truly irregular.

Figure 1A:
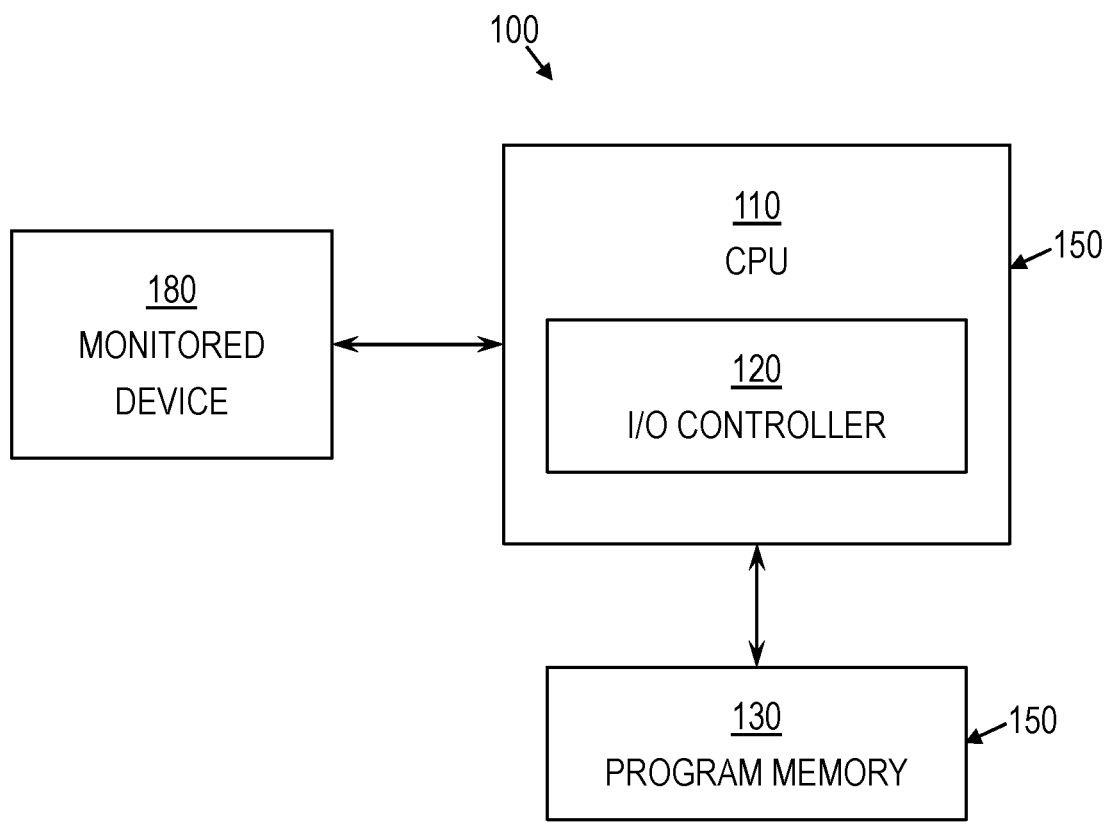
FIGS. 1A-1B are block diagrams of an analysis system, according to some embodiments of this disclosure.
Figure 1B:
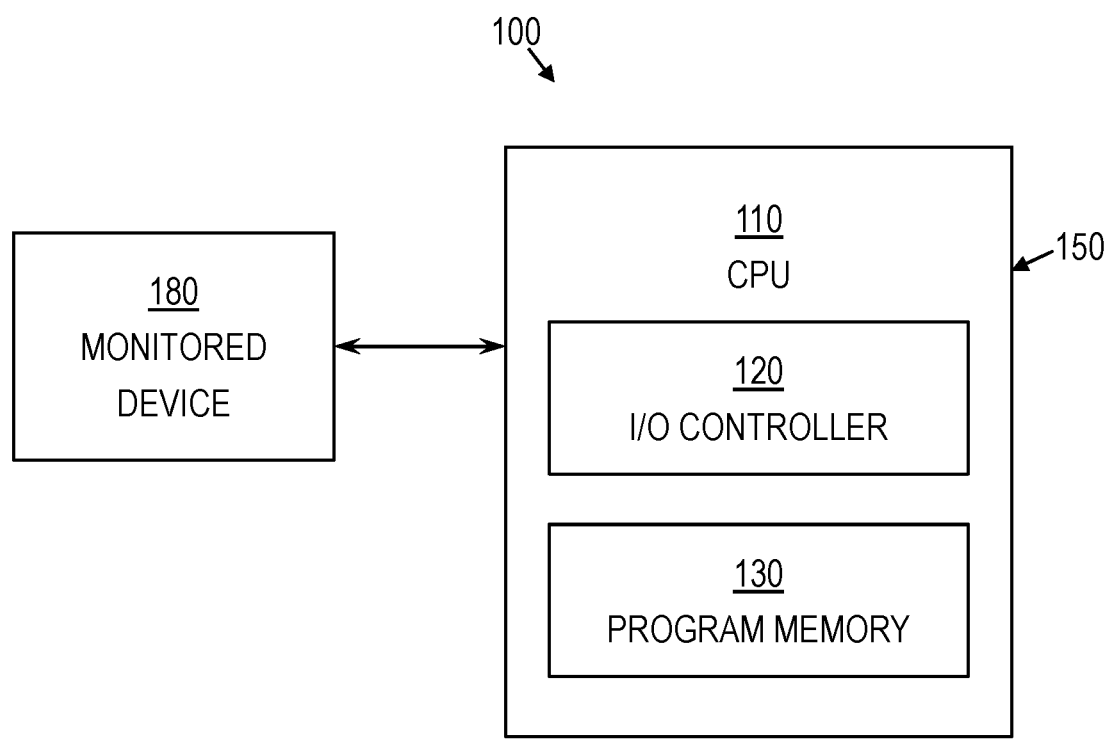

FIGS. 1A-1B are block diagrams of an analysis system 100, according to some embodiments of this disclosure. As shown, the analysis system 100 may include a central processing unit (CPU) 110, with an input/output (I/O) controller 120 on the same chip 150. The CPU 110 may be in communication with program memory 130, which may be storage for instructions used to analyze a data stream. As shown in FIG. 1A, the program memory 130 may reside on a separate chip 150 from the program memory 130, or as in FIG. 1B, the program memory 130 may reside onboard the CPU 110.

The analysis system 100 may include an architecture that eliminates or reduces storage of data in a data stream. In other words, in some embodiments, the data being streamed is not maintained in a data memory. Rather, the data may be analyzed and then discarded, so that the analysis system 100 can analyze new data in the data stream as the new data arrives. A resulting benefit of this is a cost-effective chip 150, excluding a data memory, as well as conservation of hardware and software resources in not having to store data from the data stream. Data may be continuously, assessed, analyzed, actioned, and then discarded. In some embodiments, program memory 130 may be required to store instructions needed for handling the data stream, or the instructions may be programmed into hardware.

The analysis system 100 may be integrated into various devices, such as a controller for a monitored device 180, where the monitored device 180 generates values in the data stream. Through analyzing the data stream, the analysis system 100 may effectively monitor and control the monitored device 180. In some embodiments, the monitored device 180 may be a piece of industrial equipment or an engine, such a jet or diesel engine. The controller implementing the analysis system 100 may reside on the same piece of equipment as the monitored device 180, such as a jet controller residing on a jet along with a jet engine being monitored, or may be located remotely.

Figure 2:
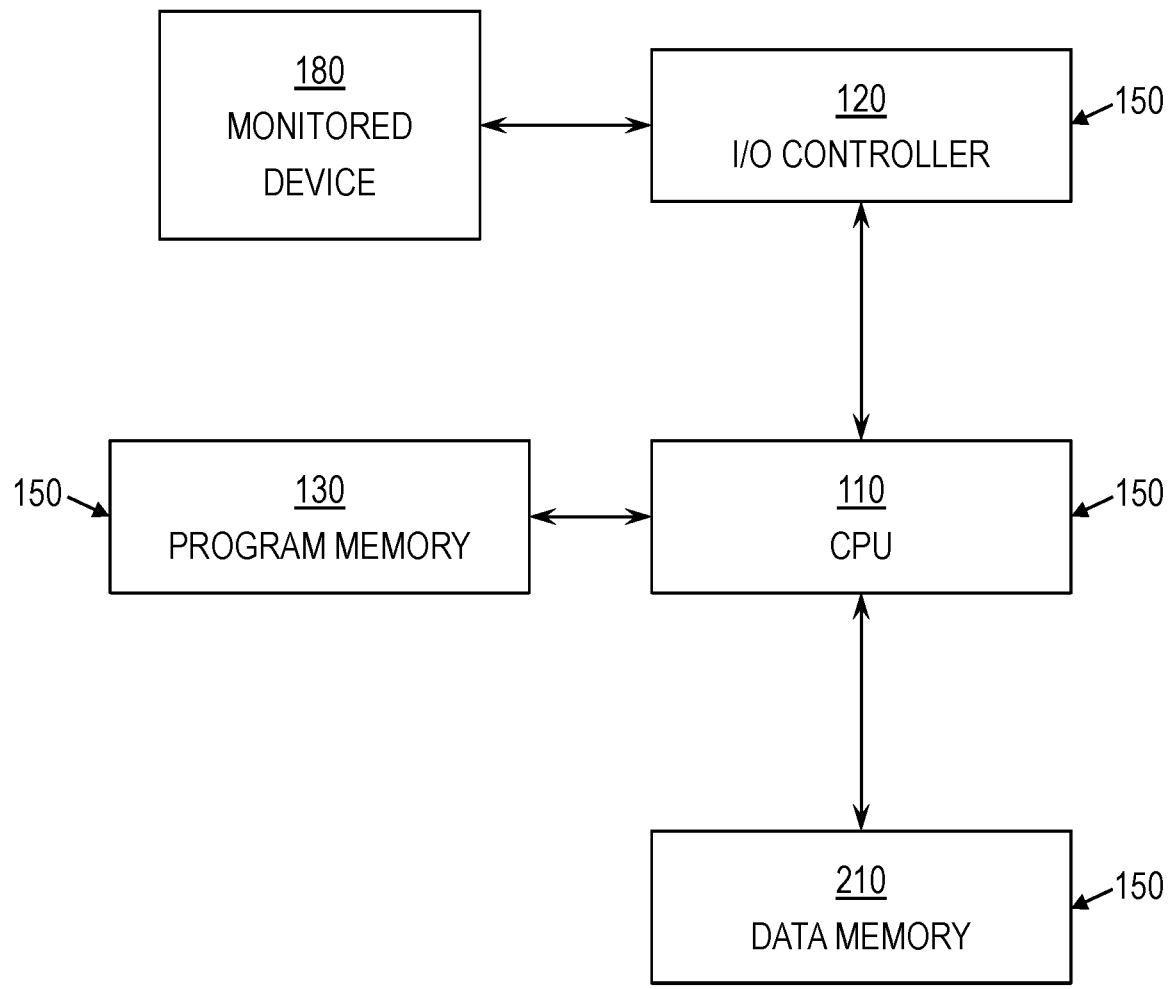
FIG. 2 is a block diagram of a conventional analysis system.

In contrast to FIG. 1, FIG. 2 illustrates a conventional architecture for analyzing streaming data. Conventionally, the values in the data stream need to be saved, so as to be analyzed as a batch to determine how to set thresholds for alerts. As shown, a conventional CPU 110, I/O controller 120, and program memory 130 may each reside on a distinct chip 150, such that these components are separate from one another. The I/O controller 120 and the program memory 130 are in communication with the CPU 110. Further, conventionally, a data memory 210 may be present for storing values from the data stream.

The real-time data-streaming nature of some embodiments of the analysis system 100 may permit elimination of the data memory 210 for storing data from the data stream, thus conserving hardware and software resources. Rather, according to some embodiments, the values may be continuously processed and cumulative sum control (CUSUM) results may be adjusted in real time. However, in some embodiments, external systems may continue to store data for other purposes. Further, it will be understood that the embodiments described above need not use the architecture illustrated in FIG. 1, and may alternatively use other architectures.

Conventionally, a Monte Carlo distribution is applied to raw data or CUSUM results to generate thresholds. In some embodiments, however, the analysis system 100 may employ one or more statistical moments to be used in determining threshold values for alerts. As compared to the use of a Monte Carlo distribution, computational overhead (e.g., memory, time, other resources) may be reduced. These moments may include, for example, the mean, variance, skewness, and kurtosis, and in some embodiments, all four of these moments may be used. Generally, the mean, variance, skewness, and kurtosis are respectively defined as follows, where $x_j$ is the $j^{th}$ value in the data stream:

$$\hat{\mu} = \frac{1}{n}\sum_{j=1}^{n} x_j$$

$$\hat{\sigma}^2 = \frac{1}{n-1}\sum_{j=1}^{n} (x_j - \hat{\mu})^2$$

$$\hat{S} = \frac{1}{n-1}\sum_{j=1}^{n} \left(\frac{x_j - \hat{\mu}}{\hat{\sigma}}\right)^3$$

$$\hat{K} = \frac{1}{n-1}\sum_{j=1}^{n} \left(\frac{x_j - \hat{\mu}}{\hat{\sigma}}\right)^4$$

Some embodiments may include higher-order statistical moments instead of or in addition to these four, in various combinations. It will be understood that use of a greater number of statistical moments may provide a better picture of the data stream, and may thus yield more effective thresholds, while the use of a fewer number may yield less accurate results while being computationally less intensive.

As discussed above the analysis system 100 need not retain data from the data stream. Despite this, the analysis system 100 may be capable of accurately maintaining values of the moments being used, based on real-time data from the data stream. For example, and not by way of limitation, the mean may be calculated based on a new value, the previous mean, and a count of how many values have occurred in the stream. One of skill in the art will understand how to perform such calculations for each moment used, without retaining historical values of the data stream. In some embodiments, the moments may be updated with each new value of the data stream, or the moments may be updated only periodically so long as variables used to update the moment (e.g., total count of values received, sum of values received) are updated with each new value.

The analysis system 100 may use the moments to calculate one or more thresholds, such as a lower threshold and an upper threshold, for values in the data stream. Methods exist in the art for calculating thresholds based on statistical moments, and these existing methods may be used for calculating the thresholds according to some embodiments. For example, and not by way of limitation, calculating thresholds may be performed by one or more of the following: Monte Carlo Methods, Statistical Process Control (SPC), Lean Sigma Six (Lean Six Sigma), Design and Operational Excellence and Design for Six Sigma (DOX/DFSS), regression, analysis of variance (ANOVA), design of experiments (DoE), and QEWS. In some embodiments, no thresholds may be calculated until a statistical confidence level is met on the moments being used. This confidence level may be set manually, or may be a default confidence level for the analysis system 100.

When one or more values in the data stream fall outside of one or more thresholds, the analysis system 100 may act accordingly. It will be understood that falling outside a threshold, or passing a threshold, may refer to values exceeding an upper threshold and to values falling below a lower threshold. Various types of actions responsive to falling outside a threshold are within the scope of the various embodiments. For example, and not by way of limitation, falling outside a threshold may trigger an alert, may initiate a modification to the monitored device 180, or may initiate a ceasing of activity from the monitored device 180. In some embodiments, there may be a hierarchy of alerts or other remedial actions, such that the specific threshold passed may determine which remedial action is performed. For instance, when a first threshold is passed, the analysis system 100 may alert another machine; when a second threshold is passed, the analysis system 100 may alert a user; and when a third threshold is passed, the analysis system 100 may alert an administrator. In general, each threshold may be associated with a remedial action, and the passing of a threshold may trigger the remedial action associated with that threshold.

Each threshold may be updated dynamically, by replacing an old threshold with a threshold that is newly calculated. Values of the data stream may be continuously received and used to update the moments, which may be continuously used to update the thresholds. Because the thresholds are based on the moments, the thresholds may also be based on the distribution of values in the data stream, because that distribution is represented by the moments. Thus, passage outside of a threshold may represent divergence from the distribution. Associated remedial actions may, therefore, be triggered whenever a threshold is passed, where these a remedial action may be designed to remediate the divergence.

Figure 3:
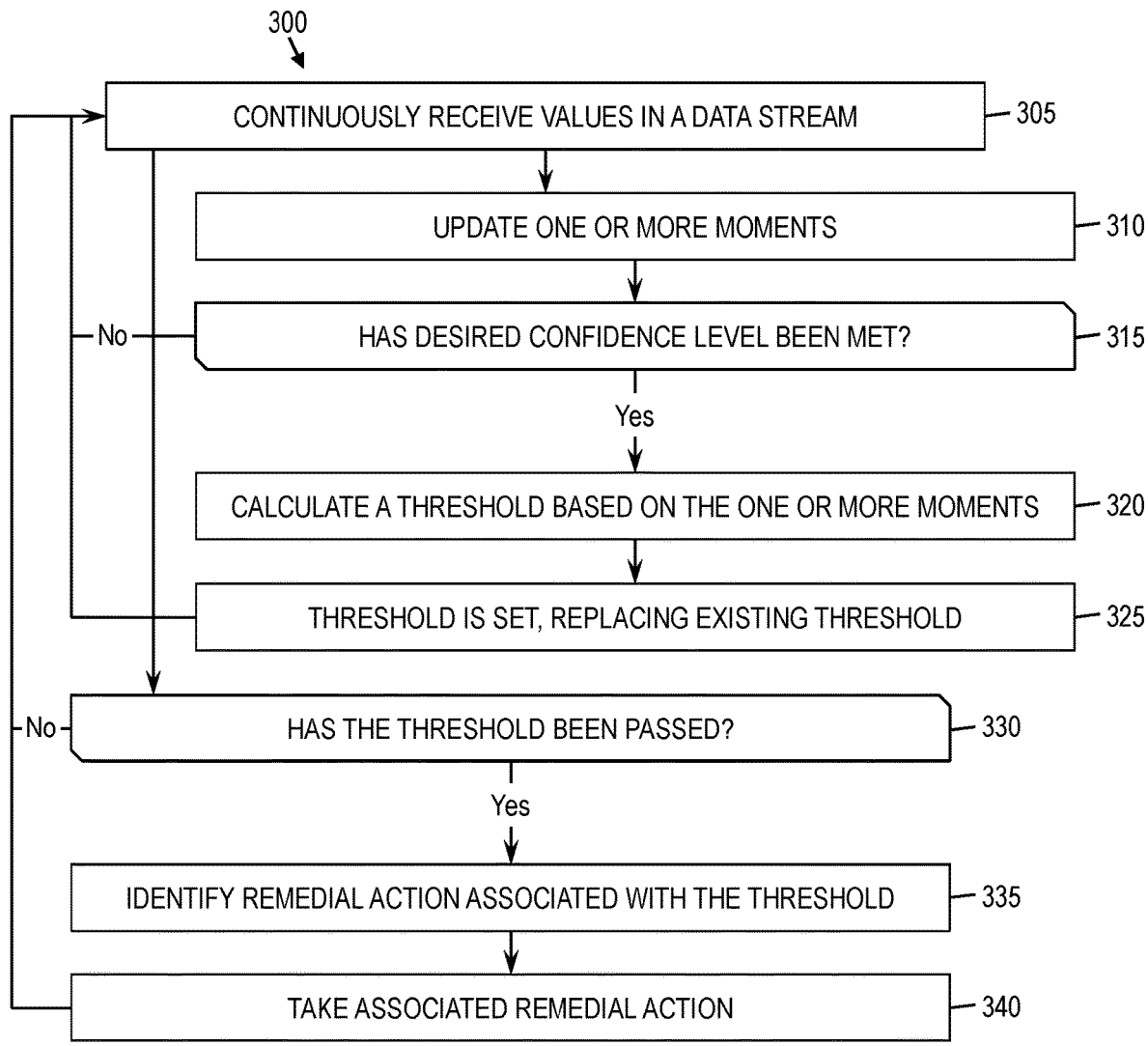
FIG. 3 is a flow diagram of a method for calculating a threshold for a data stream and triggering a remedial action, according to some embodiments of this disclosure.

FIG. 3 is a flow diagram of a method 300 for calculating a threshold for a data stream and triggering a remedial action, according to some embodiments of this disclosure. It will be understood that this method 300 applies to a data stream in real time, and thus, the operations of the various blocks described below may be performed continuously as values in the data stream are received. As shown, at block 305, values in the data stream may be continuously received by the analysis system 100. These values may be used both to update the moments and to be compared against existing thresholds to determine whether an action is triggered. Thus, from block 305, the method 300 may proceed both to block 310 and to decision block 330.

At block 310, based on each value received, the analysis system 100 may update the one or more moments being used. At decision block 315, it may be determined whether a desired confidence level has been met. If the desired confidence level has not been met, then the method 300 may return to block 305 to receive further values in the data stream so that the moments can be updated at 310, and the confidence level can be tested again at decision block 315. However, if the desired confidence level has been met, then at block 320, at least one threshold may be calculated based on the one or more moments. At block 325, the threshold may be set, replacing an existing threshold as needed. The method 300 may then return to block 305, where values of the data stream may then continue to be received.

At decision block 330, it may be determined whether the threshold has been passed by the data stream. If not, the method 300 may return to block 305, where values of the data stream may continue to be received. However, if the threshold has been passed, then at block 335, a remedial action associated with the passed threshold may be identified. At block 340, that associated remedial action may be taken, triggered by the passing of the threshold. The method 300 may then return to block 305, where values in the data stream may continue to be received.

It will be understood that the values in the data stream may represent attribute data (i.e., discontinuous, non-parametric) or variable data (i.e., continuous, parametric). In some embodiments, the analysis system 100 may be capable of applying two or more statistical models to calculate the thresholds, where each statistical model is a different mechanism for calculating the thresholds. For example, and not by way of limitation, a statistical model may determine which moments are used for calculating thresholds as well as how those moments are used in such calculation. However, it will be understood that a statistical model need not use moments, but may use other means for determining a threshold. These statistical models may be selected from those known in the art, and may be based on design preferences of the analysis system 100.

Each statistical model may implement a parametric method suited for variable data, or a non-parametric method suited for attribute data. Further, each statistical model may be associated with a type of data, either attribute or variable, such that a first statistical model is associated with attribute data and a second statistical model is associated with variable data. The associations may be based on which statistical models are better suited for which types of data, as would be understood by one skilled in the art.

In some embodiments, the analysis system 100 may by default assume that the data stream includes a certain type of data, either attribute or variable. Therefore, by default, the analysis system 100 may apply a statistical model associated with the default type of data. For example, and not by way of limitation, the default assumption may be that the data stream provides variable data, and thus the default statistical model may be associated with variable data.

As values of the data stream are received, the analysis system 100 may detect the type of data. Various mechanisms exist in the art for detecting whether values in the data stream represent attribute or variable data, and these mechanisms may be used by the analysis system 100. For example, and not by way of limitation, the analysis system 100 may be familiar with the monitored device 180 and may know what type of data it provides. For another example, the values themselves may be examined to make the determination based on known mechanisms.

In some embodiments, the analysis system 100 may switch to a different statistical model when it is determined that the type of data in the data stream is not associated with the active statistical model. In that case, the analysis system 100 may switch to a new statistical model associated with the detected data type, and the new statistical model may become active while the previously active statistical model may become inactive. The active statistical model may be used to set thresholds, and as discussed above, the thresholds may be used to trigger associated remedial actions.

Further, if the analysis system 100 switches statistical models frequently, this frequent switching may trigger remedial action. For example, a threshold frequency may be established, such as N switches in statistical models within a unit of time, where N is a fixed or customizable value. When the threshold frequency is met by the switches between statistical models, the analysis system 100 may trigger remedial action. For example, the remedial action may be designed to check whether systemic errors exist, and may include checking for errors in hardware or software associated with the monitored device 180 or the analysis system 100.

Figure 4:
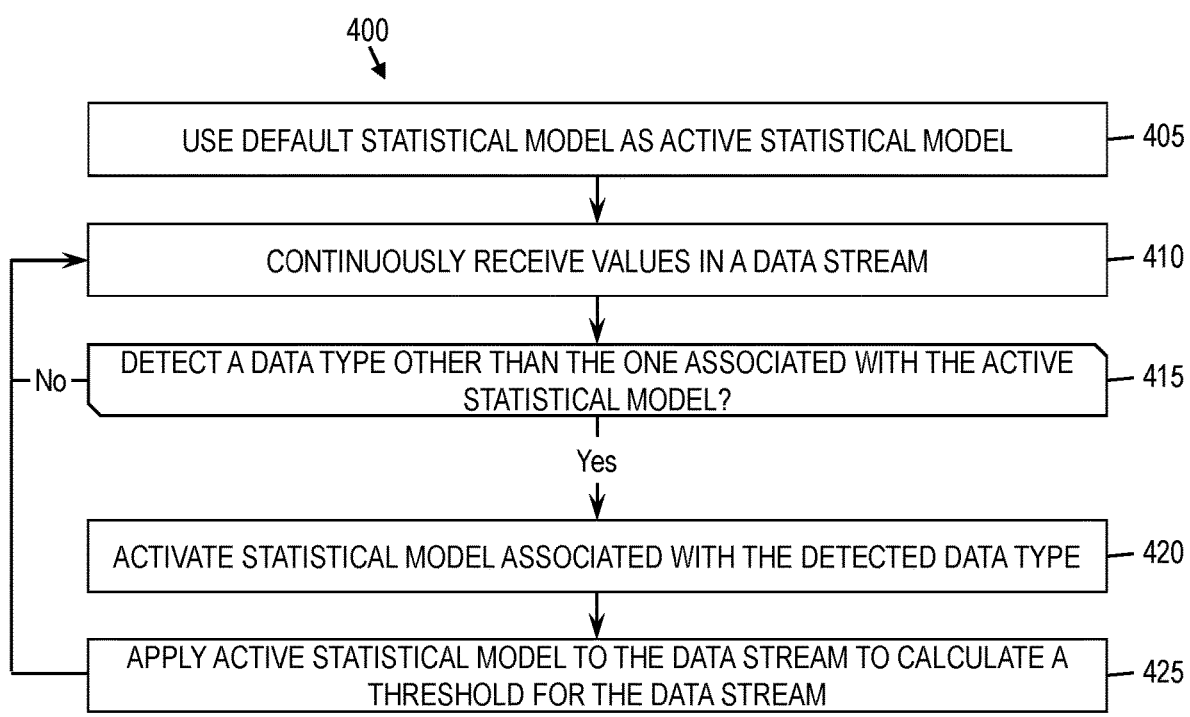
FIG. 4 is a flow diagram of a method for calculating a threshold for a data stream, according to some embodiments of this disclosure.

FIG. 4 is a flow diagram of a method 400 for calculating a threshold for a data stream, according to some embodiments of this disclosure. It will be understood that this method 400 applies to a data stream in real time, and thus, the operations of the various blocks described below may be performed continuously as values in the data stream are received.

As shown, at block 405, a default statistical model may be used as an active statistical model. The default statistical model may be associated with a first data type, such as attribute or variable. At block 410, values in a data stream may be received continuously. At decision block 415, it may be determined whether a data type other than the one associated with the active statistical model is detected in the data stream. If not, then the method 400 may return to block 410, where values in the data stream may continue to be received. However, if a data type other than the one associated with the active statistical model is detected, then at block 420, a statistical model associated with the detected data type may be activated in lieu of the currently active statistical model, which may be deactivated. At block 425, the active statistical model may be applied to the data stream to calculate at least one threshold. In some embodiments, application of the active statistical model may include calculating the threshold based on one or more statistical moments, as discussed above, but this is not required. The method 400 may then return to block 410, where values of the data stream may continue to be received.

In some embodiments, rather than switching between statistical models, the analysis system 100 may use two or more statistical models at a given time, and may compare the results of the statistical models to determine which one appears to give a more accurate depiction of the distribution of values in the data stream. For instance, the analysis system 100 may apply a first statistical model associated with variable data and a second statistical model associated with attribute data. Thus, regardless of whether the data stream represents variable or attribute data, at least one of the statistical models may be suited to the data type of the data stream. An advantage of such embodiments over those illustrated in FIG. 4 may be that using multiple statistical models need not require determining a data type of the data stream.

In some cases, the two or more statistical models being used concurrently may disagree with respect to a proposed value of a threshold. In other words, they may each calculate different thresholds as proposed thresholds, and these proposed thresholds need not match. In that case, the analysis system 100 may determine which proposed threshold is valid, in most accurately reflecting the distribution of the data stream. Various mechanisms may be used to determine which proposed threshold most accurately reflects the distribution. For example, and not by way of limitation, the proposed thresholds may be evaluated based on the standard error or the coefficient of variation of values in the data stream. When a proposed threshold is selected, that proposed threshold may be set as a threshold for the data stream, and competing proposed thresholds from the one or more statistical models may be discarded. As discussed above, the thresholds may be used to trigger associated remedial actions.

Figure 5:
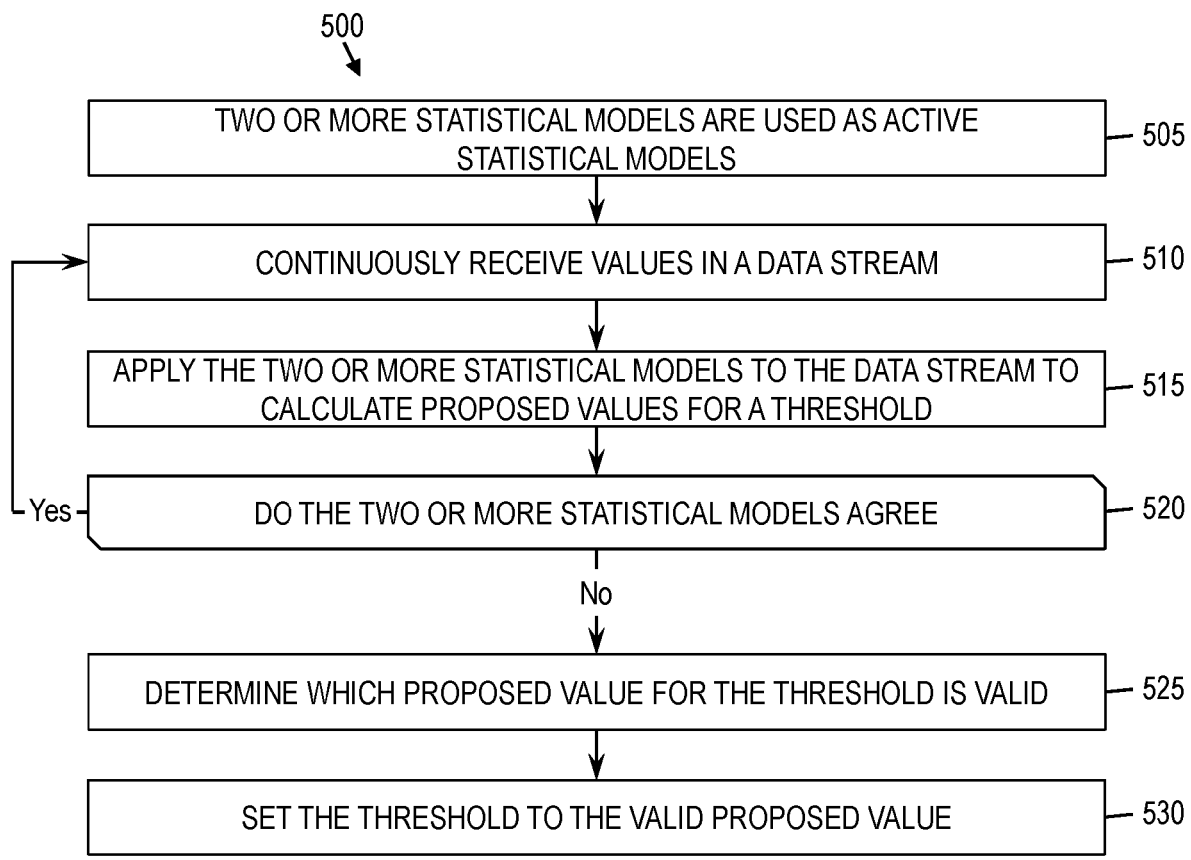
FIG. 5 is another flow diagram of a method for calculating a threshold for a data stream, according to some embodiments of this disclosure.

FIG. 5 is another flow diagram of a method 500 for calculating a threshold for a data stream, according to some embodiments of this disclosure. It will be understood that this method 500 applies to a data stream in real time, and thus, the operations of the various blocks described below may be performed continuously as values in the data stream are received.

As shown, at block 505, two or more statistical models may be used as active statistical models. At block 510, values in the data stream may be received continuously. At block 515, the two or more statistical models may be applied to the data stream, such that each of the statistical models calculates a proposed value for a threshold. In some embodiments, at least one of these statistical models may calculate its proposed value based on the one or more moments, as discussed above, but this is not required. At decision block 520, it may be determined whether the two or statistical models agree on the threshold. If they agree, then the method 500 may return to block 510, where further values of the data stream may be received continuously. However, if the statistical models disagree, then at block 525, it may be determined which proposed value for the threshold is valid. At block 530, the valid proposed value may be set as the threshold.

It will be understood that embodiments of the analysis system 100 may be used for various purposes. For example, and not by way of limitation, the monitored device 180 may be an engine, such as the engine of a jet. The jet may also include a controller, where the controller includes a chip 150 embodying the analysis system 100. The analysis system 100 in the controller may receive the data stream from the engine. In this case, the data stream may include values representing an aspect of the engine's operation or environment. For instance, the data stream may represent a measurement of the engine's temperature or fuel consumption, or the thrust or velocity of the jet. The engine may generate a new value in the data stream each picosecond, nanosecond, or other unit of time. Based on the data stream, the analysis system 100 may determine at least one threshold representing an expected range of values in the data stream. If a value passes outside the threshold, the controller may take an associated remedial action to remediate the situation.

Figure 6:
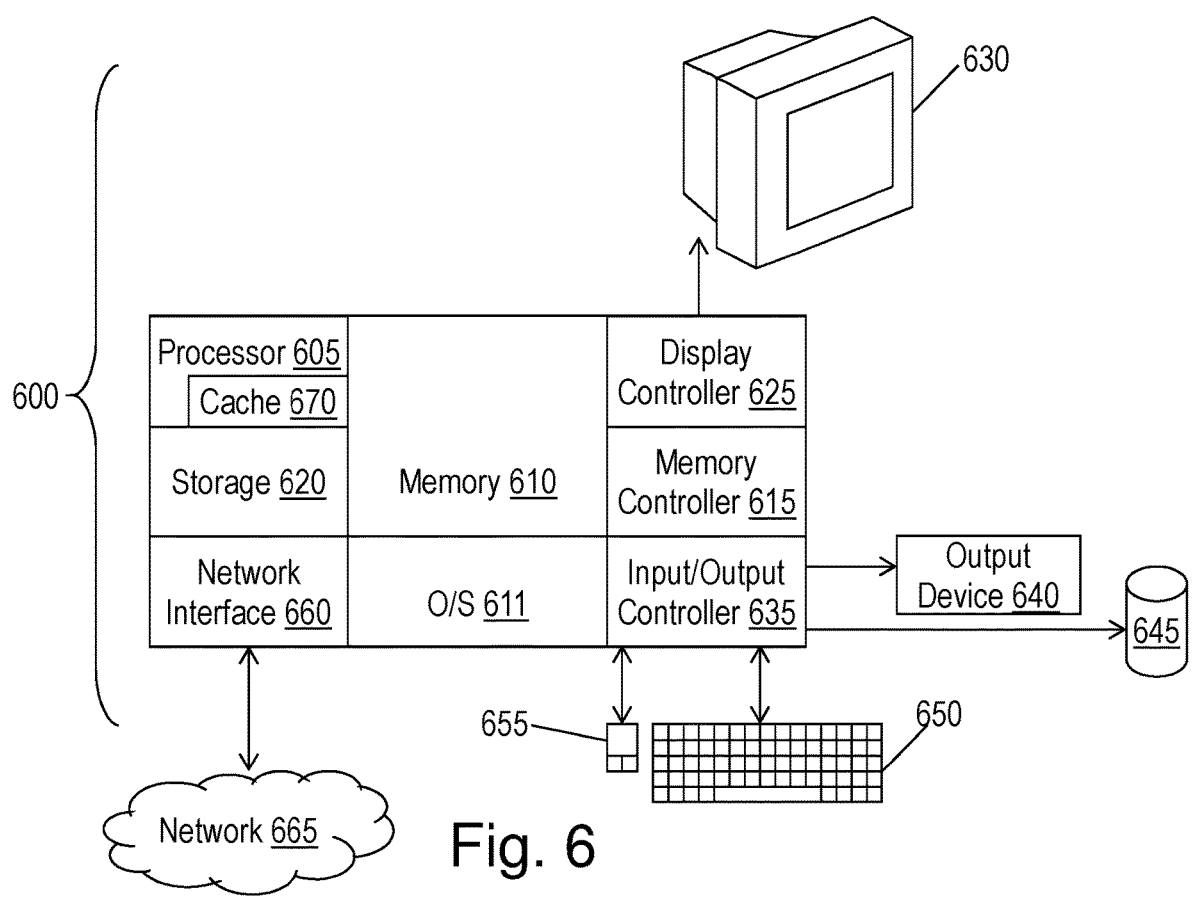
FIG. 6 is a block diagram of a computer system for implementing some or all aspects of the analysis system, according to some embodiments of this disclosure.

FIG. 6 illustrates a block diagram of a computer system 600 for use in implementing an analysis system 100 or method according to some embodiments. The analysis systems 100 and methods described herein may be implemented in hardware, software (e.g., firmware), or a combination thereof. In some embodiments, the methods described may be implemented, at least in part, in hardware and may be part of the microprocessor of a special or general-purpose computer system 600, such as a personal computer, workstation, minicomputer, or mainframe computer. For instance, the chip 150 on which all or a portion of the analysis system 100 is integrated may be installed in a computer system 600 and operable as part of the computer system 600.

In some embodiments, as shown in FIG. 6, the computer system 600 includes a processor 605, memory 610 coupled to a memory controller 615, and one or more input devices 645 and/or output devices 640, such as peripherals, that are communicatively coupled via a local I/O controller 635. These devices 640 and 645 may include, for example, a printer, a scanner, a microphone, and the like. Input devices such as a conventional keyboard 650 and mouse 655 may be coupled to the local I/O controller 635. The local I/O controller 635 may be, for example, one or more buses or other wired or wireless connections, as are known in the art. The local I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in memory 610. The processor 605 may be a custom made or commercially available processor, a CPU 110, an auxiliary processor among several processors associated with the computer system 600, a semiconductor based microprocessor (in the form of a microchip or chip set), a macroprocessor, or other device for executing instructions. The processor 605 includes a cache 670, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 670 may be organized as a hierarchy of more cache levels (L1, L2, etc.).

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services.

Additional data, including, for example, instructions for the processor 605 or other retrievable information, may be stored in storage 620, which may be a storage device such as a hard disk drive or solid state drive. The stored instructions in memory 610 or in storage 620 may include those enabling the processor to execute one or more aspects of the analysis systems 100 and methods of this disclosure.

The computer system 600 may further include a display controller 625 coupled to a display 630. In some embodiments, the computer system 600 may further include a network interface 660 for coupling to a network 665. The network 665 may be an IP-based network for communication between the computer system 600 and an external server, client and the like via a broadband connection. The network 665 transmits and receives data between the computer system 600 and external systems. In some embodiments, the network 665 may be a managed IP network administered by a service provider. The network 665 may be implemented in a wireless fashion, e.g., using wireless protocols and technologies, such as WiFi, WiMax, etc. The network 665 may also be a packet-switched network such as a local area network, wide area network, metropolitan area network, the Internet, or other similar type of network environment. The network 665 may be a fixed wireless network, a wireless local area network (LAN), a wireless wide area network (WAN) a personal area network (PAN), a virtual private network (VPN), intranet or other suitable network system and may include equipment for receiving and transmitting signals.

Analysis systems 100 and methods according to this disclosure may be embodied, in whole or in part, in computer program products or in computer systems 600, such as that illustrated in FIG. 6.

Technical effects and benefits of some embodiments include the ability to analyze a data stream in real time to trigger remedial actions. In some embodiments, this does not require storing values in the data stream, thus conserving storage space. Further, in some embodiments, the analysis system 100 may effectively handle both attribute and variable data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a plurality of values of a data stream, the plurality of values being generated by a monitored device and being received in real time;
updating, by a computer processing device, one or more statistical moments of the data stream based on each value of the plurality of values;
discarding each value of the plurality of values, after updating the one or more statistical moments of the data stream based on the value;
setting a threshold for the data stream based on the one or more statistical moments, wherein the setting the threshold comprises:
 changing an active statistical model, responsive to a data type of the data stream differing from a data type associated with the active statistical model, wherein the active statistical model is used to calculate the threshold; and
 applying the active statistical model to the one or more statistical moments to recalculate the threshold;
detecting that the threshold has been passed by the data stream; and
performing a remedial action on the monitored device, responsive to the threshold being passed, the remedial action being associated with the threshold.

2. The computer-implemented method of claim 1, wherein the setting the threshold for the data stream based on the one or more statistical moments further comprises:
associating a first statistical model with a first data type, the first data type being variable data;
associating a second statistical model with a second data type, the second data type being attribute data type; and
setting the active statistical model as one of the first statistical model and the second statistical model.

3. The computer-implemented method of claim 1, wherein the setting the threshold further comprises:
   applying a first statistical model to the one or more statistical moments to calculate a first proposed threshold;
   applying a second statistical model to the data stream to calculate a second proposed threshold;
   determining that the first proposed threshold and the second proposed threshold disagree;
   determining which of the first proposed threshold and the second proposed threshold is valid;
   setting the active statistical model as one of the first statistical model and the second statistical model, based on which of the first proposed threshold and the second proposed threshold is valid; and
   selecting the threshold from among the first proposed threshold and the second proposed threshold, based on which of the first proposed threshold and the second proposed threshold is valid.

4. The computer-implemented method of claim 3, wherein the determining which of the first proposed threshold and the second proposed threshold is valid is based on at least one of a standard of error and a coefficient of variance of the data stream.

5. The computer-implemented method of claim 3, wherein the first statistical model is associated with variable data, and the second statistical model is associated with attribute data.

6. The computer-implemented method of claim 1, wherein the one or more statistical moments comprise at least one of a mean, a variance, a skewness, and a kurtosis of the data stream.

7. The computer-implemented method of claim 1, wherein the threshold is dynamic, and wherein the setting the threshold for the data stream based on the one or more statistical moments is performed repeatedly to update the threshold.

8. A system comprising:
   a memory having computer readable instructions; and
   one or more processors for executing the computer readable instructions, the computer readable instructions comprising:
      receiving a plurality of values of a data stream, the plurality of values being generated by a monitored device and being received in real time;
      updating, by a computer processing device, one or more statistical moments of the data stream based on each value of the plurality of values;
      discarding each value of the plurality of values, after updating the one or more statistical moments of the data stream based on the value;
      setting a threshold for the data stream based on the one or more statistical moments, wherein the setting the threshold comprises:
         changing an active statistical model, responsive to a data type of the data stream differing from a data type associated with the active statistical model, wherein the active statistical model is used to calculate the threshold; and
         applying the active statistical model to the one or more statistical moments to recalculate the threshold;
      detecting that the threshold has been passed by the data stream; and
      performing a remedial action on the monitored device, responsive to the threshold being passed, the remedial action being associated with the threshold.

9. The system of claim 8, wherein the setting the threshold for the data stream based on the one or more statistical moments further comprises:
   associating a first statistical model with a first data type, the first data type being variable data;
   associating a second statistical model with a second data type, the second data type being attribute data type; and
   setting the active statistical model as one of the first statistical model and the second statistical model.

10. The system of claim 8, wherein the setting the threshold further comprises:
    applying a first statistical model to the one or more statistical moments to calculate a first proposed threshold;
    applying a second statistical model to the data stream to calculate a second proposed threshold;
    determining that the first proposed threshold and the second proposed threshold disagree;
    determining which of the first proposed threshold and the second proposed threshold is valid;
    setting the active statistical model as one of the first statistical model and the second statistical model, based on which of the first proposed threshold and the second proposed threshold is valid; and
    selecting the threshold from among the first proposed threshold and the second proposed threshold, based on which of the first proposed threshold and the second proposed threshold is valid.

11. The system of claim 10, wherein the determining which of the first proposed threshold and the second proposed threshold is valid is based on at least one of a standard of error and a coefficient of variance of the data stream.

12. The system of claim 10, wherein the first statistical model is associated with variable data, and the second statistical model is associated with attribute data.

13. The system of claim 8, wherein the one or more statistical moments comprise at least one of a mean, a variance, a skewness, and a kurtosis of the data stream.

14. The system of claim 8, wherein the threshold is dynamic, and wherein the setting the threshold for the data stream based on the one or more statistical moments is performed repeatedly to update the threshold.

15. A computer program product for analyzing streaming data, the computer program product comprising a non-transitory computer readable storage medium having program instructions embodied therewith, the program instructions executable by a processor to cause the processor to perform a method comprising:
    receiving a plurality of values of a data stream, the plurality of values being generated by a monitored device and being received in real time;
    updating, by a computer processing device, one or more statistical moments of the data stream based on each value of the plurality of values;
    discarding each value of the plurality of values, after updating the one or more statistical moments of the data stream based on the value;
    setting a threshold for the data stream based on the one or more statistical moments, wherein the setting the threshold comprises:
       changing an active statistical model, responsive to a data type of the data stream differing from a data type associated with the active statistical model, wherein the active statistical model is used to calculate the threshold; and
       applying the active statistical model to the one or more statistical moments to recalculate the threshold;

detecting that the threshold has been passed by the data stream; and performing a remedial action on the monitored device, responsive to the threshold being passed, the remedial action being associated with the threshold.

16. The computer program product of claim 15, wherein the setting the threshold for the data stream based on the one or more statistical moments further comprises:

associating a first statistical model with a first data type, the first data type being variable data;

associating a second statistical model with a second data type, the second data type being attribute data type; and setting the active statistical model as one of the first statistical model and the second statistical model.

17. The computer program product of claim 15, wherein the setting the threshold further comprises:

applying a first statistical model to the one or more statistical moments to calculate a first proposed threshold;

applying a second statistical model to the data stream to calculate a second proposed threshold;

determining that the first proposed threshold and the second proposed threshold disagree;

determining which of the first proposed threshold and the second proposed threshold is valid;

setting the active statistical model as one of the first statistical model and the second statistical model, based on which of the first proposed threshold and the second proposed threshold is valid; and selecting the threshold from among the first proposed threshold and the second proposed threshold, based on which of the first proposed threshold and the second proposed threshold is valid.

18. The computer program product of claim 17, wherein the determining which of the first proposed threshold and the second proposed threshold is valid is based on at least one of a standard of error and a coefficient of variance of the data stream.

19. The computer program product of claim 17, wherein the first statistical model is associated with variable data, and the second statistical model is associated with attribute data.

20. The computer program product of claim 15, wherein the one or more statistical moments comprise at least one of a mean, a variance, a skewness, and a kurtosis of the data stream.

* * * * *